United States Patent
Schütz et al.

(10) Patent No.: US 10,710,459 B2
(45) Date of Patent: Jul. 14, 2020

(54) METHOD FOR IMPLEMENTING AT LEAST ONE POWER SUPPLY PROCEDURE FROM AT LEAST ONE POWER SUPPLY UNIT TO AT LEAST ONE TRANSPORTATION VEHICLE TO BE SUPPLIED WITH POWER

(71) Applicants: VOLKSWAGEN AG, Wolfsburg (DE); KUKA DEUTSCHLAND GMBH, Augsburg (DE)

(72) Inventors: Daniel Schütz, Lehre/Essenrode (DE); Michael Grote, Gifhorn (DE); Jürgen Stieg, Isenbüttel (DE); Lutz Junge, Braunschweig (DE); Sven Horstmann, Berlin (DE); Thorsten Bagdonat, Braunschweig (DE); Sebastian Grysczyk, Braunschweig (DE); Andreas Weiser, Braunschweig (DE); Norbert Settele, Petersdorf-Willprechtszell (DE)

(73) Assignees: VOLKSWAGEN AG (DE); KUKA DEUTSCHLAND (DE)

( * ) Notice: Subject to any disclaimer, the term of this patent is extended or adjusted under 35 U.S.C. 154(b) by 64 days.

(21) Appl. No.: 16/063,616

(22) PCT Filed: Dec. 19, 2016

(86) PCT No.: PCT/EP2016/081674
§ 371 (c)(1),
(2) Date: Jun. 18, 2018

(87) PCT Pub. No.: WO2017/103249
PCT Pub. Date: Jun. 22, 2017

(65) Prior Publication Data
US 2019/0001832 A1    Jan. 3, 2019

(30) Foreign Application Priority Data
Dec. 18, 2015 (DE) .......... 10 2015 225 988

(51) Int. Cl.
*B60L 53/30* (2019.01)
*B60L 11/18* (2006.01)
(Continued)

(52) U.S. Cl.
CPC .......... *B60L 11/1835* (2013.01); *B60L 53/14* (2019.02); *B60L 53/305* (2019.02); *B60L 53/36* (2019.02);
(Continued)

(58) Field of Classification Search
CPC .... B60L 11/1835; B60L 53/36; B60L 53/305; Y02T 90/125; H02J 7/0027
(Continued)

(56) References Cited

U.S. PATENT DOCUMENTS

2010/0201309 A1* 8/2010 Meek .............. B60L 53/34
320/108
2011/0077809 A1* 3/2011 Leary .............. B60L 53/34
701/22
(Continued)

FOREIGN PATENT DOCUMENTS

DE    102009006982 A1    8/2009
DE    102011118397 A1    5/2012
(Continued)

OTHER PUBLICATIONS

Search Report for International Patent Application No. PCT/EP2016/081674; dated Mar. 29, 2017.

*Primary Examiner* — Edward Tso
*Assistant Examiner* — Aaron Piggush
(74) *Attorney, Agent, or Firm* — Barnes & Thornburg LLP

(57) ABSTRACT

A method for supplying power from at least one power supply unit to transportation vehicles requiring a power supply, in which a position of a transportation vehicle-side
(Continued)

power supply interface of a transportation vehicle requiring power is determined for each transportation vehicle and the transportation vehicle-side power supply interface is automatically coupled to a power supply interface of the power supply unit by the power supply interface of the power supply unit being moved by a robot to the transportation vehicle-side power supply interface and coupled thereto. A robot is responsible for coupling transportation vehicles to a suitable power supply interface of the power supply unit.

14 Claims, 5 Drawing Sheets

(51) Int. Cl.
  *B60L 53/37* (2019.01)
  *B60L 53/36* (2019.01)
  *B60L 53/14* (2019.01)
(52) U.S. Cl.
  CPC ............ *B60L 53/37* (2019.02); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01)

(58) Field of Classification Search
  USPC .......................................... 320/104, 107, 109
  See application file for complete search history.

(56) References Cited

U.S. PATENT DOCUMENTS

| | | | |
|---|---|---|---|
| 2011/0254504 A1 | 10/2011 | Haddad et al. | |
| 2014/0092243 A1 | 4/2014 | Ichikawa | |
| 2016/0046198 A1* | 2/2016 | Krammer | B62D 15/025 |
| | | | 701/22 |
| 2019/0001831 A1* | 1/2019 | Schutz | B60L 11/1835 |

FOREIGN PATENT DOCUMENTS

| | | |
|---|---|---|
| DE | 102012216980 A1 | 4/2013 |
| DE | 102013217623 A1 | 4/2014 |
| DE | 102013206587 A1 | 10/2014 |
| DE | 102013207906 A1 | 10/2014 |
| DE | 102014217494 A1 | 3/2015 |
| DE | 102014015668 A1 | 4/2016 |
| DE | 102014220261 A1 | 4/2016 |
| DE | 112013006982 T5 | 4/2016 |
| WO | 2010098397 A1 | 9/2010 |
| WO | 2013041133 A1 | 3/2013 |
| WO | 2014174361 A2 | 10/2014 |

\* cited by examiner

METHOD FOR IMPLEMENTING AT LEAST ONE POWER SUPPLY PROCEDURE FROM AT LEAST ONE POWER SUPPLY UNIT TO AT LEAST ONE TRANSPORTATION VEHICLE TO BE SUPPLIED WITH POWER

PRIORITY CLAIM

This patent application is a U.S. National Phase of International Patent Application No. PCT/EP2016/081674, filed 19 Dec. 2016, which claims priority to German Patent Application No. 10 2015 225 988.9, filed 18 Dec. 2015, the disclosures of which are incorporated herein by reference in their entireties.

SUMMARY

Illustrative embodiments relate to a method for carrying out at least one power supply operation between a power supply unit and at least one transportation vehicle to be supplied with power.

Furthermore, illustrative embodiments relate to a transportation vehicle and to a power supply unit for carrying out the disclosed method.

DETAILED DESCRIPTION

Figure 1:
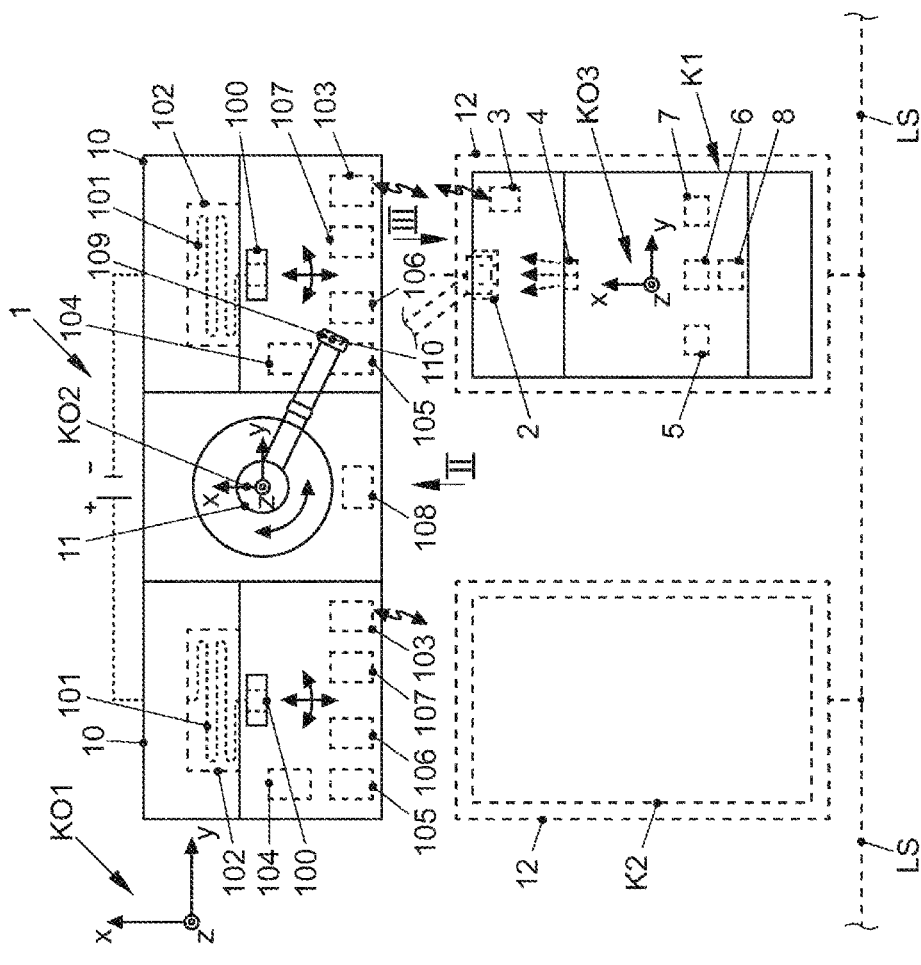
FIG. 1 shows a power supply unit from above in a bird's eye view.

Documents WO 2013/041133 A1 and DE 10 2009 006 982 A1 have disclosed a method and a power supply unit in accordance with the features of the preamble of claims 1 and 10.

Specifically, WO 2013/041133 A1 discloses a power supply unit (charging unit) which can be moved on a rail and can move to a multiplicity of parking spaces of a parking area and can supply parked electric transportation vehicles with electric current.

The movable charging unit is equipped with an image capture device, such as a camera, which serves to detect a position of a power supply interface (charging interface) of a transportation vehicle to be charged. To simplify the image capture, it is proposed to provide the charging interface with suitable visual features, for example, lamps, markings or reflectors. Furthermore, it is proposed that the charging unit can grip a plurality of charging cables by a robot arm, which charging cables are arranged at the head end of the parking spaces of the parking area. The robot removes the charging cable in each case after moving to a parking space, by the robot gripping an associated charging plug from a mounting and subsequently plugging it into the charging interface of the transportation vehicle to be charged. To synchronize the charging operation between an electric transportation vehicle to be charged and the charging unit, at least one confirmation of the charging operation by way of the transportation vehicle driver is required. Therefore, a communication of the transportation vehicle with the charging unit is made possible via a communications device, for example, via a WLAN port.

DE 10 2009 006 982 A1 has disclosed a power supply unit which is equipped with a multiple-joint robot arm which serves to position and connect a charging plug to a charging socket of a transportation vehicle to be charged. In addition, the power supply unit has a detector unit for determining the position of the charging socket of the transportation vehicle. The detector unit detects the position of the charging socket of the transportation vehicle on the basis of optical or geometric features of the charging socket.

Furthermore, a communications device is arranged on the power supply unit, which communications device is configured to receive information of the transportation vehicle and of a charge controller. The charge controller serves to initiate a start or termination of a charging operation on the basis of the charging state of the transportation vehicle.

It is also proposed to configure the detector unit for determining the position of the charging socket on the basis of an RFID chip (RFID=Radio Frequency Identification).

Finally, DE 10 2012 216 980 A1 describes a robot charging station for charging a battery of an electric transportation vehicle. Here, the robot is fastened movably to an upright tube which is coupled to a base plate.

The robot comprises a gripping member with an electric plug which serves for coupling to a transportation vehicle-side charging socket.

To detect the presence of a transportation vehicle to be charged, there is a sensor in the base plate, which sensor uses optical, acoustic or else RFID-based detection methods or mechanisms.

Furthermore, in the vicinity of the plug, the arm of the robot comprises a camera, to detect the position of a transportation vehicle-side charging socket and therefore to be capable of moving the gripping member of the robot precisely to the transportation vehicle-side charging socket. It is also proposed to use a plurality of cameras, for it to be possible to provide a stereoscopic view of the transportation vehicle and/or its charging socket.

A common feature of the above prior art is that the positional determination of a transportation vehicle-side power supply interface always takes place on the power supply unit side.

Disclosed embodiments provide a method for carrying out a power supply operation between a power supply unit and a transportation vehicle which is to be supplied with power, which method can be carried out simply and efficiently.

Furthermore, the disclosed embodiments provide a suitable transportation vehicle and a suitable power supply unit for carrying out the disclosed method.

Disclosed embodiments proceed initially from a method for carrying out a power supply operation between a power supply unit and a transportation vehicle which is to be supplied with power. Here, a position of a transportation vehicle-side power supply interface is determined, and an automated coupling takes place between the transportation vehicle-side power supply interface and a power supply interface of the power supply unit. The automated coupling is brought about by virtue of the fact that the power supply interface of the power supply unit is moved by way of a robot to the transportation vehicle-side power supply interface and is coupled to the latter.

It is then proposed that the position of the transportation vehicle-side power supply interface relative to the power supply unit is determined by way of the transportation vehicle itself before the power supply operation is carried out, and is transmitted by the transportation vehicle to the power supply unit.

In this way, the method can be of very efficient design.

It is therefore not necessary before a power supply operation is carried out that a positional detection of the transportation vehicle-side power supply interface is carried out on the side of the power supply unit. This can lead to time gains when a plurality of transportation vehicles are to be served by way of one power supply unit.

Thus, for example, a second transportation vehicle to be supplied can then already determine the position of its power supply interface relative to the power supply unit and can transmit it to the power supply unit, while a first transportation vehicle is already being supplied with power. At the beginning of the power supply operation of the second transportation vehicle, a preceding determination of the position of the transportation vehicle-side power supply interface is then no longer necessary, which entails a corresponding time benefit. The robot already knows the positional data and can move directly to the position.

It is expressly noted here that the term "power" is not only electric power, such as current, but rather also chemical energy, such as liquid or gaseous fuel (for example, gasoline, diesel, gas, hydrogen).

The term "power supply unit" is also to be understood accordingly, which power supply unit can be configured, for example, in the manner of a charging station for electric current, a fuel pump for fuel or the like. A combination of embodiments of this type is certainly conceivable against the background of hybrid transportation vehicles.

Furthermore, the robot can be integrated structurally into the power supply unit as a structural unit, but does not have to be. The robot can also be configured as a separately actuable movement device for the power supply interface of the power supply unit. Otherwise, "robot" is to be understood to mean every device which is suitable for moving a power supply interface of the power supply unit and for being coupled to a power supply interface of a transportation vehicle. In concrete form, a simple actuator, or else a complex industrial robot with a plurality of degrees of freedom can therefore already be understood to be a robot.

In accordance with a first disclosed embodiment, the position of the transportation vehicle-side power supply interface is determined using optically detectable features of the power supply unit.

This contributes to the simplification of the method, since optically detectable features can be detected satisfactorily and reliably by way of available image capture units, such as cameras or scanners.

Optically detectable features can be, for example, markings which are applied to the power supply unit or special geometric shapes of the power supply unit.

In this context, it is to be noted that the use of a very wide variety of measuring systems is conceivable for carrying out the disclosed method or for determining the position of a transportation vehicle-side power supply interface.

Thus, for example, the use of a type of sensor strip is conceivable, in the case of which a depth sensor, a webcam, a 3D microphone and an acceleration sensor are combined with one another. As a result, prominent geometric points of the power supply unit can be measured very satisfactorily in space.

With the use of laser scanners, markings or geometric shapes of the power supply unit can be detected accurately and inexpensively by the known triangulation method.

Photonic mixer devices (PMD cameras) operate in accordance with the principle of the light pulse method, in the case of which measuring objects are illuminated by light pulses and the signal propagation delay is measured. The distance between the camera and the object can be calculated on the basis of the propagation delay.

The use of a plurality of (at least two) cameras which are arranged close to one another is conceivable for the three-dimensional measurement (photogrammetry) of geometric shapes of the power supply unit.

Depending on the favored measuring system, the markings can be configured as reflecting stickers or reflecting hemispheres (that is to say, as passive markings) or so as to be self-illuminating, for example, as light emitting diodes (that is to say, as active markings).

As soon as the optically detectable features of the power supply unit and/or its position have/has been determined by way of a suitable image capture device of the transportation vehicle, the position of the transportation vehicle-side power supply interface can also be extrapolated by way of known methods of coordinate transformation.

The precise position of an image capture device (for example, a camera or scanner) in the transportation vehicle relative to the transportation vehicle-side power supply interface is known. If the position of the image capture device relative to the optically detectable features of the power supply unit is determined, the position of the transportation vehicle-side power supply interface relative to the optically detectable features of the power supply unit can accordingly also be extrapolated.

Nevertheless, it can certainly be helpful if, in another disclosed embodiment, the determination of the position of the transportation vehicle-side power supply interface additionally takes place by way of the robot using optically detectable features in the region of the transportation vehicle-side power supply interface. The accuracy of the positional determination can be increased by way of a redundancy of this type in the measurement.

Regardless of the claimed method, however, it is conceivable that the position of the transportation vehicle-side power supply interface takes place solely by way of at least one image capture device which is arranged on the robot.

In this case, it is appropriate and expedient to facilitate the image detection if the transportation vehicle to be supplied has a power supply interface, around the outside of which at least three optically detectable features are attached which are distributed non-uniformly around the power supply interface in relation to a reference point of the power supply interface and/or are encoded in each case.

As has already been mentioned, disclosed embodiments relate to a transportation vehicle for carrying out the disclosed method. This is distinguished by the fact that it has at least one image capture device, an image processing unit for processing the detected image signals, a memory unit, a comparison unit, a computing unit and a communications unit. The image capture device, the processing unit, the memory unit, the comparison unit, the computing unit and the communications unit are connected to one another using signal technology. They are configured in such a way that features of the power supply unit which can be detected optically by way of the image capture device can be detected, and a detected feature pattern can be compared with a reference pattern which is stored in the memory unit. In the case of a positive comparison with the reference pattern, a position of the transportation vehicle-side power supply interface relative to the power supply unit can be calculated by way of the computing unit on the basis of the detected feature pattern. The position can then be transmitted via the communications unit to the power supply unit.

The image capture device can be configured, for example, as a commercially available webcam or else as a laser scanner. For example, the configuration as a WLAN port or as another wireless communication methods or mechanisms, such as BLUETOOTH®, is conceivable as a communications unit.

It has been shown that it is extremely beneficial for the accuracy and immunity to errors of the positional determination in the case of a positional determination of the transportation vehicle-side power supply interface by way of an image capture device if the transportation vehicle has a power supply interface, around the outside of which at least three optically detectable features are arranged which are arranged distributed non-uniformly around the power supply interface in relation to a reference point of the power supply interface. A defined plug-in contact can be selected as a reference point, for example, in the case of a configuration of the power supply interface as an electric socket.

The optically detectable features may be stuck on as markings.

Here, "non-uniform" within the context of the disclosure means that the optically detectable features are arranged differently in terms of their radial spacing from a reference point of this type and/or that they are arranged at different angular spacings from one another within a round angle of 360 degrees about the reference point.

Therefore, the term "on the outside around the power supply interface" means that the optically detectable features are not constituent parts of the power supply interface itself.

Here, it is beneficial to the accuracy of the positional detection if there are four optically detectable features.

Furthermore, the reliability of the positional detection can also be improved or accelerated if each of the markings is encoded. Encoding of this type can be realized, for example, by way of a circular pattern which is interrupted at different points.

As an alternative, it is also conceivable that the transportation vehicle has a power supply interface, to which a frame-like component is fastened which has a different color than the power supply interface itself.

Thus, for example, power supply interfaces which are configured as electric sockets are usually black in configuration. This makes an image capture considerably more difficult. If a frame-like component which has, for example, the color gray or white is attached to the power supply interface, a satisfactory contrast can be produced in a simple way and the image capture can be facilitated.

Finally, disclosed embodiments also relate to a power supply unit for carrying out the disclosed method. The power supply unit has at least one robot for moving at least one power supply interface of the power supply unit to a power supply interface of a transportation vehicle. Furthermore, the power supply unit is provided with at least one communications device which can be configured, for example, as a WLAN port or as another wireless radio connection (for example, BLUETOOTH®).

The power supply unit is distinguished by the fact that it is provided with a plurality of optically detectable features, and the at least one communications device is configured at least for communication with a transportation vehicle-side communications device. The communication can be carried out in such a way that at least positional data of the transportation vehicle-side power supply interface relative to the power supply unit can be received.

The optically detectable features may be applied to the power supply unit as markings.

To facilitate the positional detection of a transportation vehicle-side image capture device relative to the power supply unit, the optically detectable features of the power supply unit can also be arranged here distributed non-uniformly around the power supply interface in relation to a reference point of the power supply interface. As an alternative or in addition, each of the optically detectable features can be encoded. The encoding can likewise be brought about via circular rings which are interrupted at different points.

Exemplary embodiments are shown in the figures and will be described in greater detail in the following description using the figures. Here, identical designations relate to identical, comparable or functionally identical components, corresponding or comparable properties and benefits being achieved, even if a repeated description is omitted.

In the figures, in each case diagrammatically:

A power supply unit 1 can be seen in FIG. 1. Specifically, the power supply unit 1 is configured as a parking space which can be driven onto by electric transportation vehicles for electric charging of the electric transportation vehicles.

Two parking space markings 12 can be seen in front of the power supply unit 1, within which parking space markings 12 transportation vehicles which are to be charged can be parked.

In the present exemplary embodiment, transportation vehicles to be charged can be parked automatically within the parking space markings by an inductive guidance system LS and can be released for charging.

The power supply unit 1 has two charging stations 10 of identical construction, between which a robot 11 for operating the two charging stations 10 is arranged. A number of charging stations which differs from this is conceivable, as is a number of robots which differs from this.

The robot 11 is configured as a multiple-arm and multiple-joint industrial robot. It has a gripping device 109, by way of which it can grip and move a power supply interface 100 of the charging station 10, such as a charging plug (cf. double arrows).

Specifically, the robot 11 can pull the charging plug 100 together with a charging cable 101 out of the charging station 10 by the gripping device 109. The charging cable 101 is held such that it can be wound up in a storage space 102 of the charging station 10. A transportation vehicle (electric transportation vehicle) K1 to be charged can be parked with a tolerance of approximately 5 cm within a parking space marking 12 on account of the guidance system LS.

To carry out a charging operation, the charging plug 100 is gripped by the gripping device 109 of the robot 11, is moved to a transportation vehicle-side power supply interface 2 of the transportation vehicle K1 to be charged, such as a charging socket, and is coupled to the latter.

So that a coupling of this type is possible in a smooth manner, the robot 11 has to previously know the precise position of the charging socket 2, however.

For this purpose, the transportation vehicle K1 is equipped with an image capture device 4, such as a stereoscopic camera, in the region of the mirror base of its interior mirror (not shown). The image capture device 4 detects its own position relative to the charging station 10 using optically detectable features of the charging station 10, which is to be described in greater detail later.

Via a coordinate system KO3 of the transportation vehicle itself, the transportation vehicle K1 knows precisely where the camera 4 is situated and also, with the aid of customary methods of coordinate transformation, where the charging socket 2 is situated relative to the camera 4. A coordinate transformation of this type is performed with the aid of a computing unit 8.

Subsequently, the positional data of the charging socket 2 relative to the charging station 10 can be transmitted by a communications device 3, for example, as a WLAN port, to a communications device 103 of the charging station 10, which communications device 103 can likewise be configured as a WLAN port.

Furthermore, an image capture unit 5, a comparison unit 6 and a memory unit 7 of the transportation vehicle K1 are indicated using dashed lines. Here, the image processing unit 5 serves to process the optical features of the charging station 10 which are recorded by the camera 4. The comparison unit 6 serves to compare a feature pattern which is recorded by way of the camera 4 with a reference pattern which is stored in the memory unit 7.

The camera 4, the image processing unit 5, the comparison unit 6, the memory unit 7, the computing unit 8 and the communications device 3 are connected to one another using signal technology.

The charging stations 10 can also be equipped in each case with an image processing unit 104, a comparison unit 105, a memory unit 106 and a computing unit 107. This is appropriate, above all, when a positional determination of the charging socket 2 is to take place as an alternative or in addition by way of the robot 11.

For this case, the gripping device 109 can be equipped with an image capture device 110 which may be configured as a commercially available and therefore inexpensive webcam.

Regardless of which unit determines the position of the charging socket 2, a control unit 108 which is assigned to the robot 11 serves to actuate the robot 11 in a manner which is dependent on the positional data of the charging socket 2 which are transmitted to it.

KO1 denotes a coordinate system of the power supply unit 1, and KO2 denotes a coordinate system of the robot 11.

If the power supply unit 1 transmits the positional data of the charging socket 2 relative to the power supply unit 1, specifically in relation to the coordinate system KO1, via the communications device 103, the computing unit 107 can also extrapolate the relative position of the charging socket 2 relative to the coordinate system KO2 of the robot on the basis of known methods of coordinate transformation, and can transmit the positional data to the control unit 108.

Figure 2:
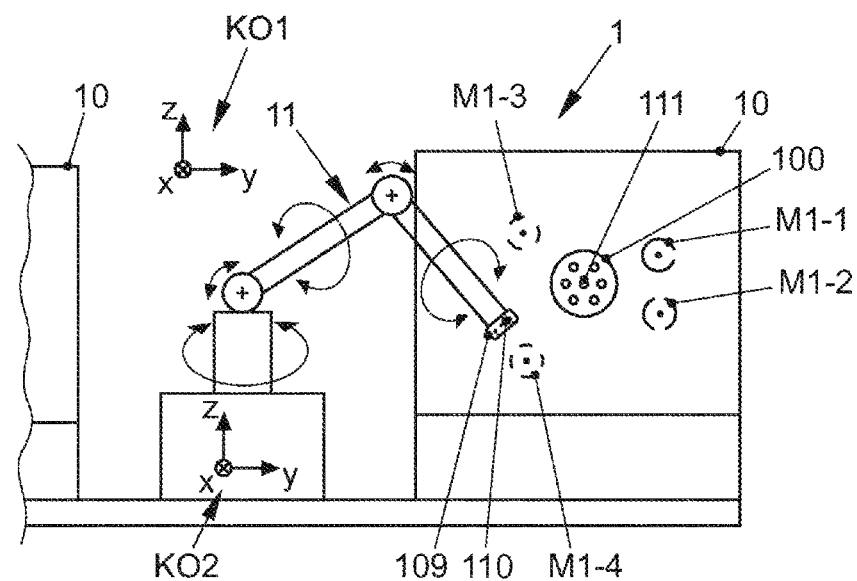
FIG. 2 shows the view of the power supply unit in accordance with a view II from FIG. 1.

FIG. 2 is now to be used to describe in greater detail which features can be used by the transportation vehicle K1 itself to detect its position or the position of its charging socket 2 relative to the power supply unit 1.

Each charging station 10 is thus provided with four optically detectable features M1-1, M1-2, M1-3 and M1-4 as markings on a wall which faces a transportation vehicle to be charged. The markings are stuck on as reflective, high contrast markings. Each of the markings is encoded, the markings being configured as circular figures and the encoding being realized in each case by way of the number of interruptions in the circle.

The marking M1-1 therefore has one interruption, the marking M1-2 has two interruptions, the marking M1-3 has three interruptions, and the marking M1-4 has four interruptions in the circle.

Furthermore, it can be seen that the markings are arranged non-uniformly around a defined reference point 111 of the charging plug 100. Their position in the coordinate system KO1 is known, however. The reference point 111 can be, for example, a grounding terminal of the charging plug 100.

Within the context of the disclosure, non-uniform is understood to mean that the markings are arranged differently in terms of their radial spacing from a reference point of this type (here, 111) and/or that they are arranged at different angular spacings from one another around a reference point of this type within a round angle (360 degrees).

Figure 3:
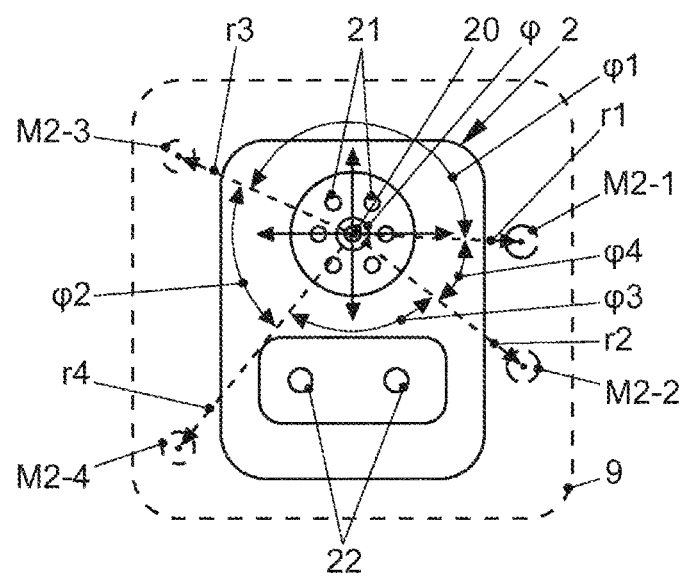
FIG. 3 shows the individual illustration of a transportation vehicle-side power supply interface from view III in FIG. 1.

This is to be described in an analogous way using FIG. 3.

The figure shows the charging socket 2 of the transportation vehicle K1, which charging socket 2 is configured in such a way that its position can also be detected as an alternative or in addition by way of the image capture device 110 of the robot 11.

It can be seen that four optically detectable features M2-1, M2-2, M2-3 and M2-4 as markings are arranged outside the actual charging socket 2, that is to say around the latter.

In the same way as the markings M1-1 to M1-4 of the charging stations 10, the markings M2-1 to M2-4 are also arranged non-uniformly around the charging socket 2. Specifically, the markings have different radial spacings r1 to r4 or different radii from a reference point 20 of the charging socket 2. The reference point 20 can be, for example, a grounding terminal of the charging socket 2.

Furthermore, the markings have different angular spacings φ1 to φ4 from one another in relation to a round angle φ of 360 degrees.

21 denotes electric contacts for alternating current, and 22 denotes contacts for direct current.

The markings M2-1 to M2-4 are encoded in the same way as the markings M1-1 to M1-4.

The accuracy and the speed of the image detection can be improved considerably by way of the non-uniform arrangement of the markings around the reference points and/or by way of their encoding.

9 denotes a pivotable covering of the charging socket 2, which covering is indicated using dashed lines.

Figure 4:
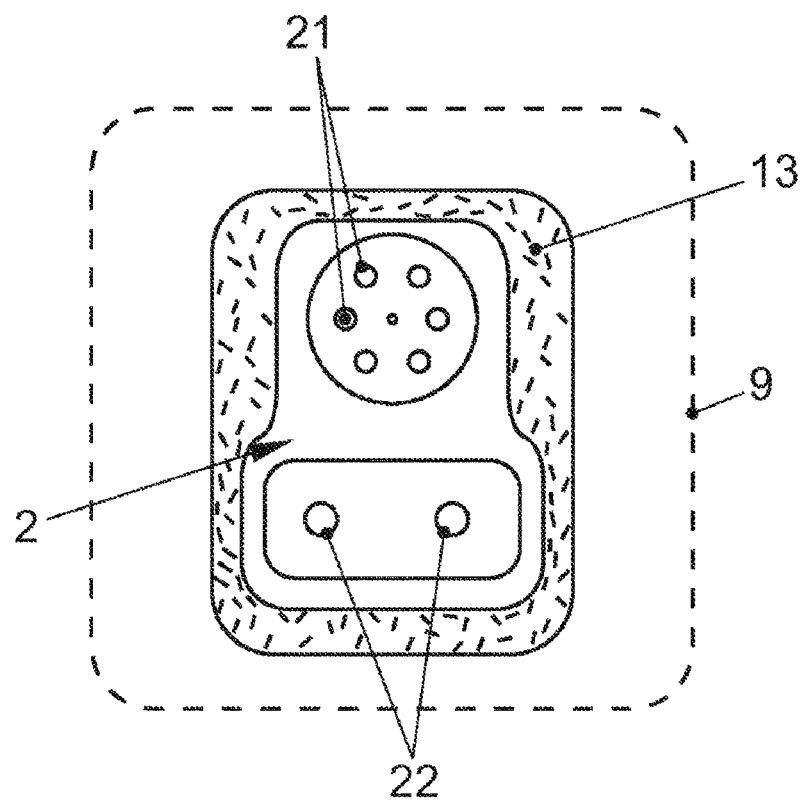
FIG. 4 shows an alternative embodiment of a transportation vehicle-side power supply interface in a comparable manner to the view from FIG. 3.

At least one disclosed embodiment of a transportation vehicle in the region of the charging socket 2 will also be described using FIG. 4, the alternative embodiment likewise considerably facilitating a detection of the charging socket 2 by way of an image capture device.

The charging socket 2 is thus covered on the edge side by way of a frame-like component 13 which is fastened releasably (for example, in a latching manner) to the charging socket 2.

In comparison with the charging socket 2 which is manufactured from black plastic, the frame-like component 13 may be manufactured from a light gray or white plastic. In this way, a very satisfactory contrast effect can be achieved, with the result that the image detection is simplified considerably for the image capture device 110 of the robot 11.

Returning to FIG. 1, it is to be noted that K2 denotes a second transportation vehicle to be charged which has been parked within a second parking space marking 12.

The transportation vehicle K2 which is of comparable construction to the transportation vehicle K1 can locate the position of its charging socket relative to the charging station 10 independently of the availability of the robot 11 and can transmit the position to the communications device 103 of the charging station 10 which is assigned to the transportation vehicle K2.

As soon as the robot 11 has completed the coupling of the first charging plug 100 to the charging socket 2 of the transportation vehicle K1, the robot 11 (already knowing the coordinates of the charging socket of the transportation vehicle K2) can grip the second charging plug 100 which is assigned to the transportation vehicle K2. The charging plug 100 can then be coupled to the charging socket of the transportation vehicle K2 in the depicted way, without a renewed positional determination of the charging socket by way of the robot 11 being necessary.

Figure 5:
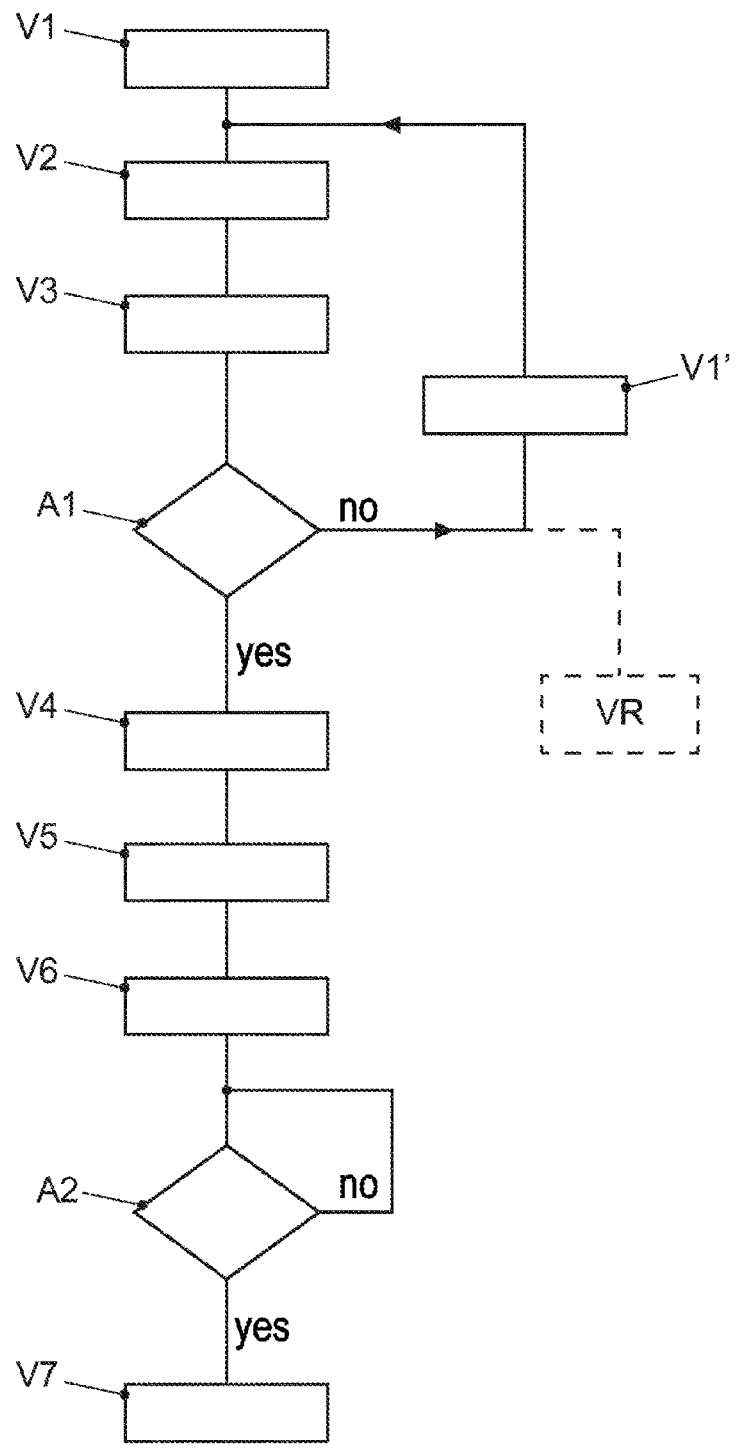
FIG. 5 shows a flow chart to clarify a first embodiment of the disclosed method.
Figure 6:
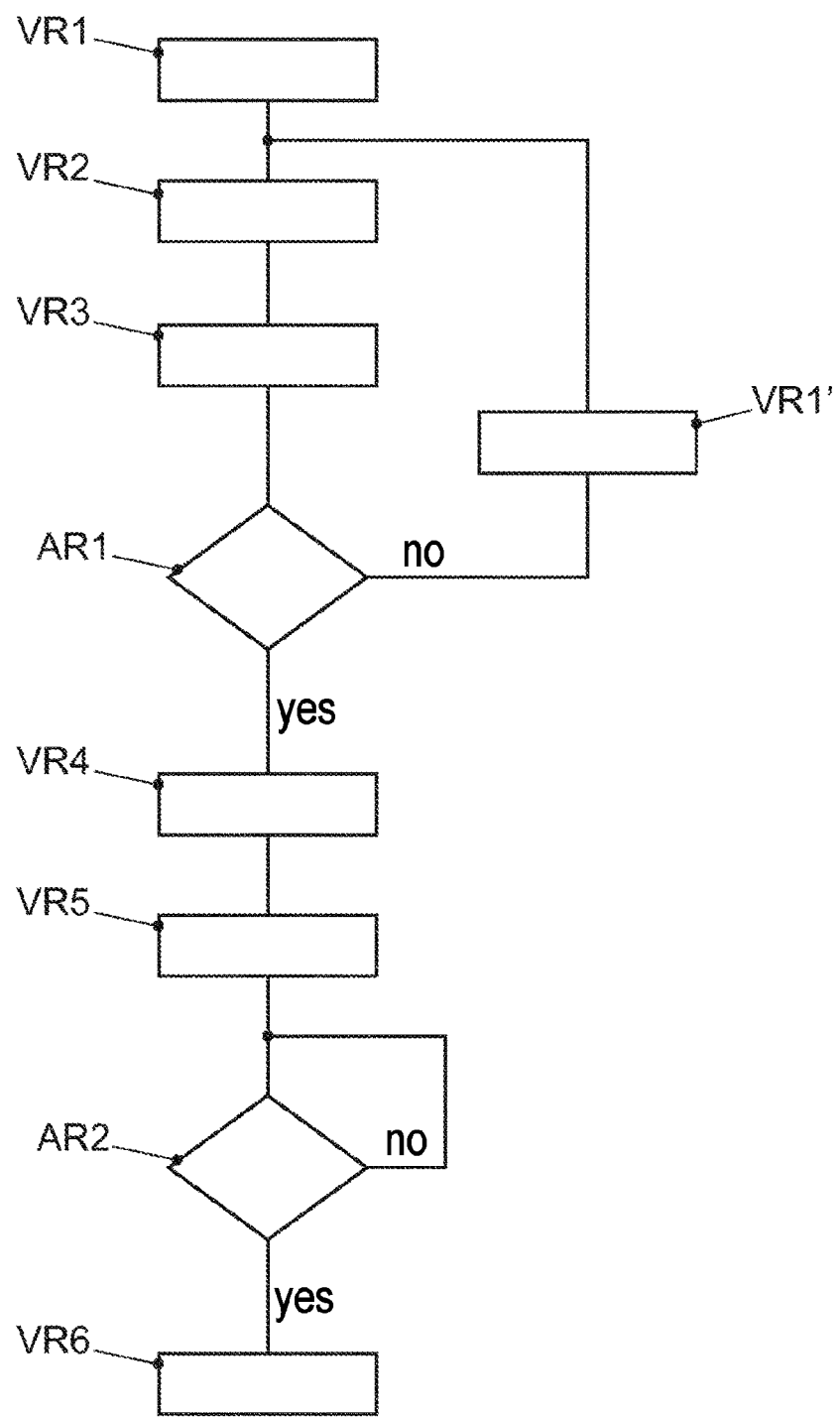
FIG. 6 shows a flow chart to clarify a disclosed embodiment of the method.

Finally, the disclosed method is to be outlined briefly once again using FIGS. 5 and 6.

Thus, in a method operation at V1 of FIG. 5, automatic parking of the transportation vehicle K1 within the parking space marking 12 with a centimeter tolerance of optionally 5 cm is first of all carried out. Subsequently, the marking pattern which results from the markings M1-1 to M1-4 around the charging plug 100 of the charging station 10 is detected by way of an image detection of the on-board camera 4 (method operation at V2).

In a method operation at V3, a comparison of the detected marking pattern with a stored reference pattern is carried out. A query A1 queries whether the detected marking pattern matches up with the stored reference pattern. If not, a compensation movement on the side of the transportation vehicle K1 to be charged has to be carried out in a method operation at V1'.

If the detected marking pattern matches up with the reference pattern, a calculation of the position of the on-board camera 4 relative to the power supply unit, in particular, relative to a reference point of the power supply unit, takes place. Finally, a position of the on-board charging socket 2 relative to the power supply unit 1 is calculated via coordinate transformation (method operation at V4).

The position coordinates are subsequently transmitted to the communications device 103 of the charging station 10 (method operation at V5). Afterward, in a method operation at V6, the charging plug 100 of the charging station 10 is moved to the transportation vehicle-side charging socket 2 and is coupled to the latter by way of the robot 11.

A query A2 queries whether the transportation vehicle is charged or not.

After charging has been carried out, the charging plug 100 is finally decoupled again from the charging socket 2 and moved back to the charging station 10 by way of the robot 11 in a method operation at V7.

In one modification of the method, if the detected marking pattern does not match up with the stored reference pattern, a process VR (indicated using dashed lines) can be initiated which comprises the method operations of VR1 to VR6 (cf. FIG. 6).

In this process, in a method operation at VR1, the image capture device 110 on the robot 11 is moved up to the transportation vehicle-side charging socket 2. In a method operation at VR2, image detection of the marking pattern which is formed by way of the markings M2-1 to M2-4 takes place. A comparison with a stored reference pattern takes place in the method operation at VR3.

If a query AR1 confirms that the detected marking pattern does not match up with the stored reference pattern, a correction movement of the robot 11 takes place in the method operation at VR1'.

If the detected marking pattern matches up with the reference pattern, the position coordinates of the on-board charging socket 2 are calculated by the computing unit 107 of the charging unit 10 and are transmitted to the control unit 108 of the power supply unit 1 (VR4).

Finally, the charging plug 100 of the charging station 10 is moved to the transportation vehicle-side charging socket 2 and is coupled to the latter by the robot 11 (method operation at VR5).

In a query AR2, a check is carried out as to whether the transportation vehicle K1 to be charged is charged or not. After charging has taken place, in a method operation at VR6, the charging plug 100 is disconnected again from the charging socket 2 and moved back to the charging station 1 by way of the robot 11.

Regardless of the method which is shown, however, it is certainly conceivable that the position of the transportation vehicle-side charging socket 2 takes place solely by way of the image capture device 110 which is attached on the robot 11 in the vicinity of the gripping device 109.

To facilitate the image capture, it is then appropriate and expedient if the transportation vehicle K1 has a charging socket 2, around the outside of which at least the three markings M2-1 to M2-4 are attached which are distributed non-uniformly around the charging socket 2 in relation to a reference point of the charging socket 2 and/or are encoded in each case.

The features already represent on their own a conceivable refinement of a transportation vehicle.

LIST OF DESIGNATIONS

1 Power supply unit
2 Transportation vehicle-side power supply interface; charging socket
3 Communications device; WLAN port
4 Image capture device; camera (stereoscopic)
5 Image processing unit
6 Comparison unit
7 Memory unit
8 Computing unit
9 Covering
10 Charging station
11 Robot
12 Parking space markings
13 Frame-like component
20 Reference point
21, 22 Electric contacts
100 Power supply interface of a charging station; charging plug
101 Charging cable
102 Storage space
103 Communications device, WLAN port
104 Image processing unit
105 Comparison unit
106 Memory unit
107 Computing unit
108 Control unit
109 Gripping device
110 Image capture device
111 Reference point
A1, A2 Query
AR1, AR2 Query
K1 Transportation vehicle
K2 Transportation vehicle
KO1 Coordinate system of the power supply unit
KO2 Coordinate system of the robot
KO3 Coordinate system of the transportation vehicle
LS Inductive guidance system
M1-1 Optically detectable feature of the power supply unit (encoded marking)

M1-2 Optically detectable feature of the power supply unit (encoded marking)
M1-3 Optically detectable feature of the power supply unit (encoded marking)
M1-4 Optically detectable feature of the power supply unit (encoded marking)
M2-1 Optically detectable feature of the transportation vehicle (encoded marking)
M2-2 Optically detectable feature of the transportation vehicle (encoded marking)
M2-3 Optically detectable feature of the transportation vehicle (encoded marking)
M2-4 Optically detectable feature of the transportation vehicle (encoded marking)
V1, V1'-V7 Method operations
VR1, VR1'-VR5 Method operations
r1-r4 Radial spacings of the markings from a reference point
φ Round angle (360°)
φ1-φ4 Angular spacings of the markings in relation to a round angle

The invention claimed is:

1. A method for carrying out at least one power supply operation between a power supply unit and at least one transportation vehicle to be supplied with power, the method comprising:
receiving, from the transportation vehicle, position coordinates indicative of a first position of a transportation vehicle-side power supply interface relative to a second position of a power supply interface of the power supply unit; and
coupling, based on the received position coordinates, the transportation vehicle-side power supply interface and a power supply interface of the power supply unit by moving the power supply interface of the power supply unit by a robot to the transportation vehicle-side power supply interface and coupling the power supply interface of the power supply unit to the transportation vehicle-side power supply interface.

2. The method of claim 1, wherein the received position coordinates of the transportation vehicle-side power supply interface are determined using optically detectable features of the power supply unit.

3. The method of claim 1, further comprising, prior to coupling, confirming the first position of the transportation vehicle-side power supply interface by determining, by the robot, a third position of the transportation vehicle-side power supply interface using optically detectable features of the transportation vehicle-side power supply interface and comparing the third position to the first position.

4. A transportation vehicle configured to receive power from a power supply unit during at least one power supply operation, the transportation vehicle comprising:
a transportation vehicle-side power supply interface;
at least one image capture device, an image processing unit, a memory unit, a comparison unit, a computing unit and a communications unit, the image capture device, the image processing unit, the memory unit, the comparison unit, the computing unit and the communications unit being connected to one another and to the power supply unit using signal technology, wherein the image capture device is configured to optically detect and capture features of a power supply interface of the power supply unit, the image processing unit is configured to analyze the captured features to identify a captured feature pattern, the comparison unit is configured to compare the captured feature pattern with a reference pattern stored in the memory unit, the computing unit is configured to calculate, based on the comparison, position coordinates indicative of a position of the transportation vehicle-side power supply interface relative to the power supply unit, and the communications unit is configured to transmit the position coordinates to the power supply unit.

5. The transportation vehicle of claim 4, wherein the transportation vehicle-side power supply interface includes a plurality of features disposed around outside of the transportation vehicle-side power supply interface, and wherein the features of the transportation vehicle-side power supply interface include at least three encoded markings distributed non-uniformly in relation to a reference point of the transportation vehicle-side power supply interface.

6. The transportation vehicle of claim 5, wherein the features of the transportation vehicle-side power supply interface include four encoded markings.

7. The transportation vehicle of claim 4, further comprising a frame component fastened to the transportation vehicle-side power supply interface, wherein a first color of the frame component and a second color of the transportation vehicle-side power supply interface are different from one another.

8. A power supply unit for carrying out at least one power supply operation to supply power to a transportation vehicle, the power supply unit comprising:
at least one power supply interface having a plurality of optically detectable features;
at least one communications device configured to communicate with a transportation vehicle-side communications device of the transportation vehicle to receive, from the transportation vehicle, position coordinates determined using the optically detectable features and indicative of a position of a transportation vehicle-side power supply interface relative to the power supply unit; and
at least one robot configured to, based on the received position coordinates, move the at least one power supply interface to the transportation vehicle-side power supply interface of the transportation vehicle to connect the power supply unit interface to the transportation vehicle-side power supply interface to supply power to the transportation vehicle.

9. The power supply unit of claim 8, wherein the optically detectable features of the power supply interface of the power supply unit are markings that are encoded and arranged to be distributed non-uniformly around the power supply interface in relation to a reference point of the power supply interface.

10. The power supply unit of claim 9, wherein the power supply interface of the power supply unit is an electric plug and the reference point of the power supply interface is a plug-in contact of the electric plug.

11. The power supply unit of claim 10, wherein the reference point is a grounding terminal of the electric plug.

12. The power supply unit of claim 9, wherein the markings are distributed non-uniformly, such that a first radial spacing between one of the markings and the reference point is different from a second radial spacing between another one of the markings and the reference point.

13. The power supply unit of claim 9, wherein the markings are distributed non-uniformly, such that a first angular spacing between a first pair of the markings relative to the reference point is different from a second angular spacing between a second pair of the markings relative to the reference point.

14. The power supply unit of claim 9, wherein the markings are circular figures, and wherein a first one of the circular figures is encoded with one interruption within a contour of the first one of the circular figures, a second one of the circular figures is encoded with two interruptions within a contour of the second one of the circular figures, and a third one of the circular figures is encoded with three interruptions within a contour of the third one of the circular figures.

\* \* \* \* \*